US008947203B2

(12) United States Patent
Kolar

(10) Patent No.: US 8,947,203 B2
(45) Date of Patent: Feb. 3, 2015

(54) AFTERMARKET SOUND ACTIVATED WIRELESS VEHICLE DOOR UNLOCKER

(76) Inventor: John Clinton Kolar, Sunnyvale, CA (US)

( * ) Notice: Subject to any disclaimer, the term of this patent is extended or adjusted under 35 U.S.C. 154(b) by 234 days.

(21) Appl. No.: 13/042,416

(22) Filed: Mar. 7, 2011

(65) Prior Publication Data
US 2012/0229253 A1    Sep. 13, 2012

(51) Int. Cl.
*E05B 85/00*    (2014.01)
*B60R 25/25*    (2013.01)
*G07C 9/00*    (2006.01)

(52) U.S. Cl.
CPC ............. *B60R 25/257* (2013.01); *E05B 85/01* (2013.01); *G07C 9/00563* (2013.01); *G07C 9/00309* (2013.01); *G07C 2009/00849* (2013.01); *G07C 2009/00984* (2013.01); *G07C 9/00174* (2013.01)
USPC ........... 340/5.72; 340/5.2; 340/5.51; 340/5.6; 340/5.61; 340/5.67

(58) Field of Classification Search
CPC .. B60R 25/257; E05B 85/01; G07C 9/00174; G07C 9/00309; G07C 9/00563; G07C 2009/00849; G07C 2009/00984
USPC ........ 340/5.6, 5.61, 480, 5.2, 5.51, 5.67, 5.72
See application file for complete search history.

(56) References Cited

U.S. PATENT DOCUMENTS

| | | | |
|---|---|---|---|
| 6,556,124 B1* | 4/2003 | Laroche | 340/5.51 |
| 7,015,791 B2* | 3/2006 | Huntzicker | 340/5.54 |
| 7,197,331 B2* | 3/2007 | Anastasakos et al. | 455/557 |
| 8,253,534 B2* | 8/2012 | Nakazawa et al. | 340/5.72 |
| 2002/0152010 A1* | 10/2002 | Colmenarez et al. | 701/36 |
| 2009/0140878 A1* | 6/2009 | Ryan et al. | 340/825.24 |
| 2009/0206990 A1* | 8/2009 | Nelson | 340/5.72 |
| 2010/0300163 A1* | 12/2010 | Loughlin et al. | 70/301 |

\* cited by examiner

*Primary Examiner* — Daniel Wu
*Assistant Examiner* — Benyam Haile
(74) *Attorney, Agent, or Firm* — Stephen E. Zweig

(57) ABSTRACT

An aftermarket, sound activated, wireless, vehicle door unlocking device comprising a sound sensor, processor, memory, and an RF transmitter, transponder, or transceiver capable of generating an unlocking signal, and method of using the device. The device may be easily installed by unskilled users without modifying the vehicle wires or structure. The operator of the device will program the device with an unlocking sound sequence, and the RF unlocking codes needed to unlock the vehicle door. The device continually monitors the sensor for unlocking sounds, and delivers a door unlocking signal when this sound is detected. Various embodiments, including embedded RF key embodiments, solar powered embodiments, and alternative ways of programming the device are also discussed.

14 Claims, 6 Drawing Sheets

AFTERMARKET SOUND ACTIVATED WIRELESS VEHICLE DOOR UNLOCKER

BACKGROUND OF THE INVENTION

1. Field of the Invention

This invention is in the field of aftermarket vehicle security systems.

2. Description of the Related Art

Many people on occasion inadvertently lock their keys inside their car, and unfortunately, most of these people have not prepared in advance for this problem (such as carrying a spare car key with them). Typically they must then call a tow service to get their door unlocked. This is a major inconvenience, both in time and cost.

A number of solutions have been proposed to solve this problem. These solutions range from simple solutions, such as magnetic key holders that can hold a spare key and can be attached to the underside of the car's body, to sophisticated solutions such as the OnStar® remote car unlocking system, which can send a long distance wireless signal to remotely unlock a car from an OnStar control center, often located hundreds or thousands of miles away.

Some modern automobiles are factory equipped with keyless door locks that respond to fingerprints, directly entered numeric unlocking codes, and voice commands. Other modern automobiles are also factory equipped to directly detect wireless unlocking signals sent from cellular phones as well as from wireless keys and key fobs. However there are millions of automobiles on the road that, while equipped with radio controlled unlocking mechanisms capable of unlocking a car door upon receiving a wireless unlocking command from a electronic key or key fob (RF key or RF key fob), are otherwise unequipped with any ability to unlock the car door if this electronic key is, for example, missing or locked inside the car.

In addition to factory equipped keyless unlocking devices, there also exists an aftermarket of various unlocking devices that can be used to convey keyless unlocking capability to a vehicle that was not originally factory equipped with this capability. These aftermarket devices may either be produced by (or under the control of) one or more vehicle manufacturers or they may be produced by independent manufacturers.

For example, Laroche, In U.S. Pat. No. 6,566,124 describes a knocking activated device with a vibration transducer. This device can be attached to the wiring of a vehicle's electronic lock. The device can store data representative of a sequence of knocks, and generate an electrical output signal, which is directly sent to the vehicles' electronic lock. When the transducer detects this sequence of knocks, the device sends an electrical output signal to the vehicles' electronic lock. A device similar to this concept, called the "Knocklock", is presently available for sale over the internet from an unknown supplier. However such devices require that the automobile owner make structural modifications to the car, and directly attach the device to the car wiring, and thus tend to be both expensive and difficult to install.

On the other extreme, very simple devices, such as magnetic spare key storage boxes, are often unsatisfactory because a thief may quickly look under the car and locate the spare key. The magnetic spare key storage box can also accidentally become detached from the car due to excessive motion or vibration.

BRIEF SUMMARY OF THE INVENTION

This invention addresses this issue. In one embodiment, it may be a small device that, when installed to an interior surface immediately adjacent to an exterior surface (such as a windshield or trunk lid), enables that person to open the car door after locking the keys inside. It is done in such a way that car security is not compromised.

The invention is based, in part, upon the insight that to help solve the lockout problem, at least with respect to an aftermarket solution designed to convey keyless entry capability to vehicles that are not factory equipped with such an option, the aftermarket device should be both inexpensive and extremely easy to install and use. The invention is also based upon the insight that because there are now millions of automobiles on the road that are factory equipped with at least wireless unlocking systems, a properly designed aftermarket keyless solution that made use of standard wireless unlocking systems would at least not require direct coupling to the automobile's wiring's system in order to be operative.

The invention is also based on the insight that the codes sent by today's wireless unlocking systems are both complex and not always easily available to the end user. Further, to foil potential thieves, such an aftermarket sound activated wireless unlocking device should be capable of being programmed with a variety of different unlocking sound sequences.

Thus in one embodiment, the invention may be an aftermarket, sound activated, wireless, vehicle door unlocking device. This device may comprise at least one transducer or microphone, at least one processor (e.g. one or more microprocessors), at least one memory device (e.g. Flash memory, RAM, ROM, or other type memory), and software (e.g. sound analysis software). The device may also comprise a wireless or radio frequency (RF) signal generator capable of sending a wireless unlocking signal to the vehicles wireless door unlocking systems. The operator of the device will typically program the device with a secret or semi-secret unlocking vibration or sound sequence, and this sequence will be stored in at least one portion of the device's memory. The operator will also generally equip the device with the codes or series of unlocking RF signals that are generally specifically set to the unlocking sequence for that particular vehicle's door locks. The device software will direct the processor to monitor the transducer for the presence of an unlocking vibration or sound sequence. When the processor (and software) detect this sound sequence, the processor (and software) will then direct a memory device and RF signal generator capable of delivering an wireless door unlocking signal to send this signal, thus unlocking the door.

Other embodiments of the system will also be discussed.

DETAILED DESCRIPTION OF THE INVENTION

It is contemplated that the invention will commonly be sold as an aftermarket device to individuals that already have vehicles that have a built-in RF key unlocking system. It is further contemplated that the invention will commonly be sold to technically unsophisticated users who will wish to configure and install the invention themselves, rather than through the assistance of specialists. These unsophisticated users will generally be unwilling to modify existing vehicle wires or access regions of the vehicle that are normally not accessed under standard use. Rather, these users will generally wish to purchase a low-cost, easy to configure device, and install it in a manner that enables the device to be easily removed from the vehicle when the vehicle is subsequently sold or otherwise transferred to another user.

Figure 1:
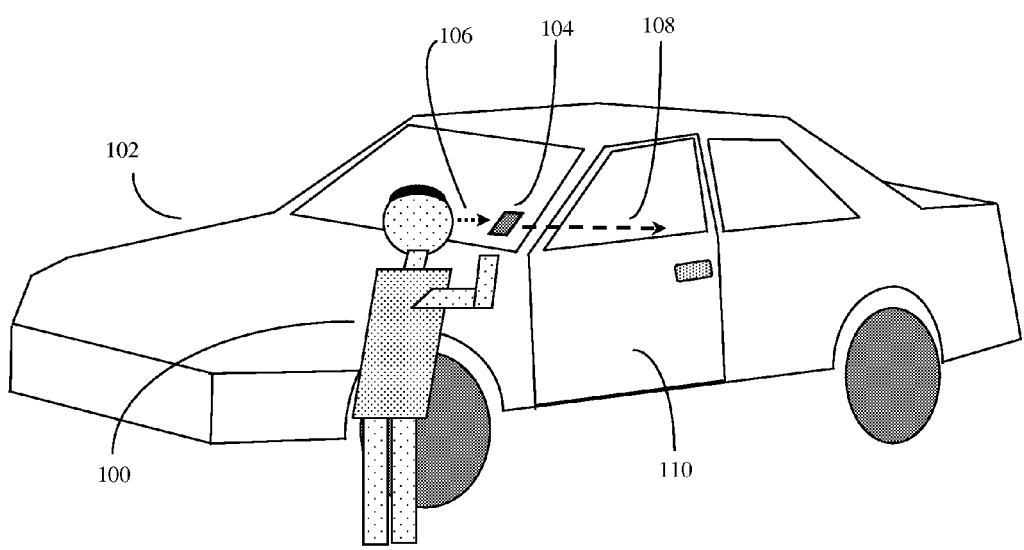
FIG. 1 shows an overview of a user using the device to unlock an automobile door.

FIG. 1 shows an example of the device in operation. Here a driver (100) has accidentally locked his keys inside a car (102). The device (104) is shown attached to the inside of the car's front window by an adhesive or other fastening device. Here the user (100) can open the car door by, for example, creating an unlocking vibration or sound (106) sequence such as a vocal phrase (i.e. "open authorization code 1234"), a sequence of knocks (for example, the beat to a popular song), a series of telephone or cell phone sounds (e.g. a series of dual-tone multi-frequency [DTMF] sounds), or other sonic or vibration sequence. Upon hearing the proper unlocking vibration or sound, the device (104) issues an unlocking radiofrequency signal (108) that unlocks the car doors (110).

Note that although device (104) may be attached to some interior (or exterior) surface of a car, it need not be so attached. The device (104) could, for example, just be sitting on the automobile dashboard, or be clipped to a visor with an easy to remove spring clip, be sitting in a seat, or other location.

Figure 2:
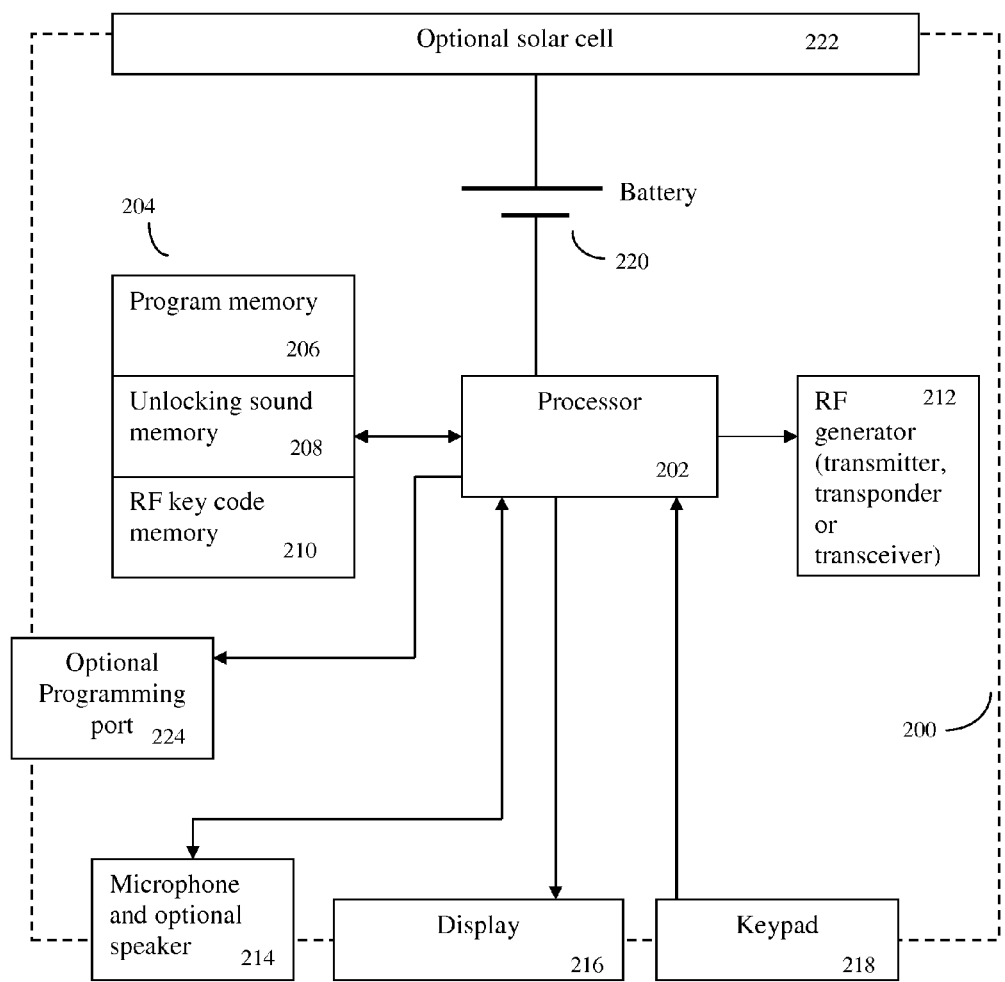
FIG. 2 shows an electrical circuit diagram of one embodiment of the invention.

FIG. 2 shows the circuit diagram for one embodiment of the device. Generally the device will comprise an electrical circuit, often mounted on a printed circuit board (PCB) (not shown), which in turn is often mounted inside a case (200). The device will generally have at least one microprocessor or microcontroller (often a low power microprocessor or microcontroller such as the popular MSP430, 8051, ARM, Atmel, Microchip, or other microprocessor series) (202). Alternatively, processor (202) can accommodate dedicated sound recognition circuits, digital signal processor circuits, or other circuits as desired. Often processor (202) will contain analog to digital circuits to enable the sounds from the microphone or other sound transducer (214) to be appropriately digitized. Alternatively these analog to digital circuits, as well as other components such as amplifiers, may be located on other electronic chips (not shown).

The device will also usually comprise memory (204), such as Flash, RAM, ROM, EPROM, or other type of computer memory. In some embodiments, some or all of this memory may be located onboard processor (202). Memory (204), which may or may not be all on the same memory chip, will often contain a portion for the program memory to control the operation of the processor and other components (206), a portion where the reference "unlocking" sound or vibration pattern is stored (208), and a portion where the door unlocking code or codes (210) is stored.

The device will also often have a radio frequency generator, transmitter, or transceiver (212). In some embodiments, this may be a separate device or chip, and in other embodiments may be incorporated as part of processor (202). In some embodiments, memory (204), processor (202), and RF generator, transmitter, or transceiver (212) may be part of the same chip.

As previously discussed, the device will also often have a sound sensor or transducer, such as a microphone or vibration sensor (214). In some embodiments, to be discussed this transducer or a dedicated speaker transducer (214) may also generate an audio signal as well. This can be helpful, for example, because this way, when the user is programming the device with the desired unlocking sound, the device can play back the sound that it has recorded as an unlocking sound, and the user can verify if the desired unlocking sound was stored or not. In these embodiments, often processor (202) will be chosen to have digital to analog converters to produce this sound. Alternatively these digital to analog converters can be located on other devices (not shown).

In some embodiments, however, the device may be configured so that the user may simply enter in a series of numbers conveying a desired sequence of knocks or sequence of touch tone DTMF sounds/codes into the device's keypad (218). In these embodiments, then no digital to analog converter circuits need be provided, and the microphone or vibration sensor (214) need not have any sound producing functionality, and no dedicated speaker transducer need be provided.

In other embodiments, both an ability to program the device using a desired unlocking sound via microphone or vibration sensor (214); as well as an ability to program the desired unlocking sound into the device by entering a series of numbers via the keypad (218) (which can be compared to a series of DTMF tones or a series of knocks when user is attempting to unlock the vehicle) may be provided. This option gives the user a range of choices by which to enter in the unlocking sound to be stored in into memory (208).

The device will also often have a visual display (216), such as a liquid crystal display (LCD), light emitting diode display (LED), electronic paper, or other electronic display device. Additionally, the device will often have at least one key, and often a keypad composed of a plurality of keys (218) for user input. In some embodiments, the display (216) may be a touch sensitive display in which case keypad (218) should be considered to be a part of display (216). The device will also often have an on/off switch (not shown), and an optional recharging plug (not shown).

The device will often be powered by either a battery (220) or an optional photovoltaic cell (solar cell) (222). This photovoltaic cell will often charge battery (220) for times, such as night time, when there is insufficient light to power the device. In some configurations, battery (220) may be supplemented by one or more capacitors to provide surge power as needed.

In some embodiments, the device may also have a programming port (224), such as a USB (universal serial bus) programming port, or other wired or wireless programming port. When programming port (224) is a wireless programming port, then the device may be configured by a suitable wireless signal such as Bluetooth™ signals. When the programming port is a USB port, then the device may also obtain power through the USB port and use this power to charge battery (220). As previously discussed, the device may also contain a dedicated charging port as well (not shown).

The series of RF unlocking codes that are sent to unlock car doors are relatively complex, and often this code will be a rolling code that will change each time an unlock signal is sent by either the device or by a different user key.

Depending upon the vehicle and type of RF key and lock system being used, various types of unlocking RF signal codes may be used by the system. An example of one such rolling code system is exemplified by the KeeLoq® system, produced by Microchip Technology Inc., Chandler Ariz., and other such systems. These systems, exemplified by U.S. Pat. No. 5,937,065, the contents of which are incorporated herein by reference, often work by a challenge and response system in which a transceiver or transponder on the RF key or key fob transmits an initial code to the vehicle. This causes the RF lock system onboard the vehicle to transmit back a challenge number, which may be randomly selected or selected from a large number of potential challenge numbers. The RF key or key fob in turn encrypts this challenge number using its own secret number, and transmits back an encrypted answer. The RF lock system onboard the vehicle can then decrypt this answer, determine if it was from a valid key, and if so unlock the door. This system is effective because each time it is used, the RF key or key fob will generate an almost unique answer number that is specific to that particular challenge number. This makes it effectively impossible for an attacker to intercept any given RF key response and use it to unlock the vehicle at a later time.

In this case, RF transmitter (212) may be a transponder or transceiver capable of detecting return RF "challenge" transmissions from the automobile unlock system, and either use these return "challenge" transmissions from the vehicle to help select the correct unlock code, or alternatively send a transmission to the vehicle to direct the vehicle to select the correct unlock code.

Due to variations in master key systems, encryption algorithms, rolling code systems, authentication and response systems, and the like, these systems will be referred to generically as "RF unlocking codes". Thus an RF unlocking code, for any particular vehicle type, should be considered to convey enough information as to allow at least a device designed for that particular vehicle type to generate a valid RF unlocking signal. More general RF unlocking codes, which might for example convey details pertaining to both master key codes, and the particular encryption algorithms used by a particular manufacturer, may also be used.

At present, often such RF key systems are programmed by a master key code that is set by the manufacturer, and this code often unique for each key. Presently master key codes with a length of approximately 64 bits are often used, but in principle the master key code may be either shorter or longer. Auto manufacturers normally keep such master key codes in a database so that they can determine, for any given vehicle, what master RF key codes are associated with each particular vehicle.

In some embodiments, assuming that the encryption algorithm or process is previously identified or programmed into the device, the user may attempt to enter in this master key code or series of codes through keypad (218). For example, assuming a 64 bit length master key code, and using hexadecimal encoding, where a single digit that is selected from either the numbers 0-9 or the letters A-F corresponds to 16 bits, then a 64 bit master key code can be adequately represented using only four hexadecimal symbols.

For security reasons, however, auto manufacturers may be reluctant to generally release such master key codes. Rather, they may wish to first authenticate the user before releasing the master key code. Further, they may wish to only release the master key code in some sort of encrypted or obfuscated form.

Figure 3:
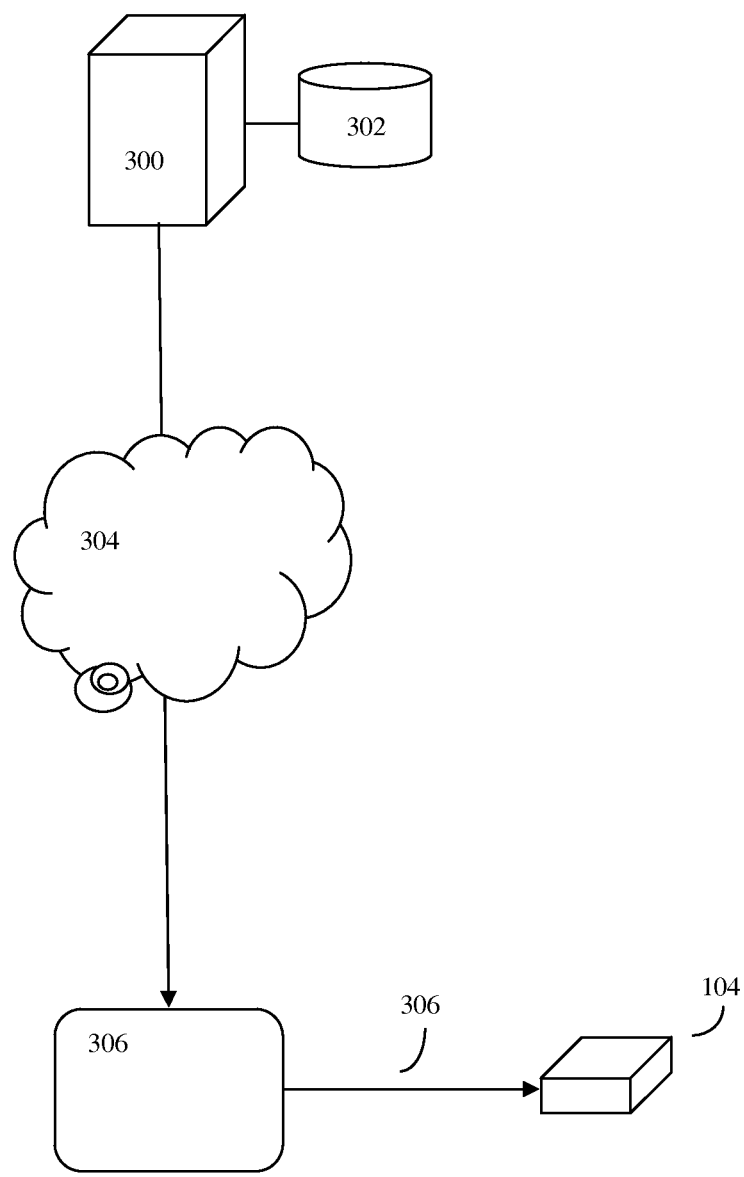
FIG. 3 shows how unlocking key codes may be downloaded to the device from a remote internet website.

In this situation, a number of alternative key code programming methods may be used. One such method is shown in FIG. 3. In this embodiment, before deploying the device (104), the user may, for example, first electronically obtain the unlock sequence codes through an Internet website hosted on a secure web server (300), which in turn will be connected to a database of such codes (302). This secure web server may be configured to first authenticate that the user is legitimate (i.e. not a thief) before releasing the master key code. These codes can then be transmitted over the internet (304) or other network to the user's local computerized device, which may be a computer, portable computer, or cell phone (306). This code can then be transferred to device (104) via the devices' programming port (224). Thus, for example, a user upon purchasing the device may enter in his or her identification information into a secure website, receive the proper code data, and this data may be transferred to the device (104) by way of a USB cable connection (308) to the devices' programming port (224). Alternatively this data may be transmitted using a different type of cable, or wirelessly.

In other embodiments, the device (104) may be programmed by way of a detachable memory stick, chip or device, such as a solid state flash memory card (e.g. a microSD card) or other such device. In this case, programming port (224) can be considered to additionally have memory card functionality.

Figure 4:
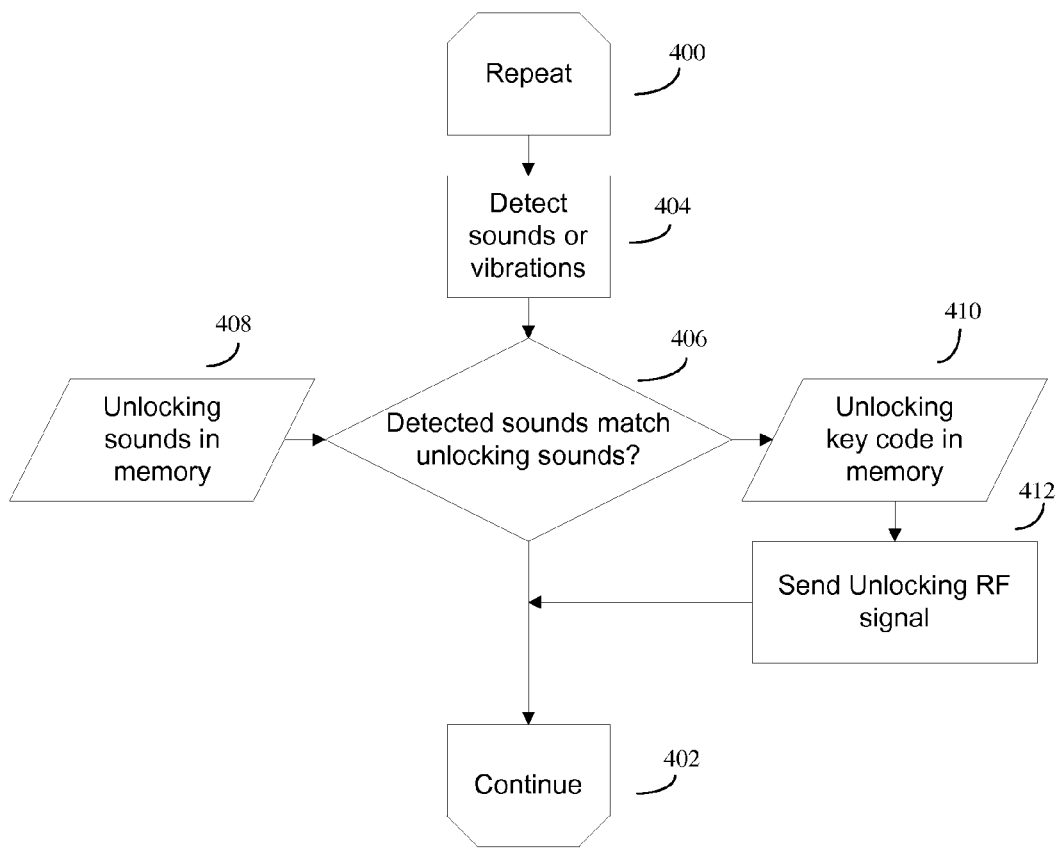
FIG. 4 shows a software flow chart for one embodiment of the invention.

FIG. 4 shows an example of the operating flow chart for the device. The device essentially spends most of its lifetime in an infinite loop (400), (402) in which it uses the sensor or transducer (214) to detect sound or vibration (404). This sound is then processed by processor (202) and software (206), and compared (406) to the unlocking sounds previously stored in device memory (408), (204), (208). If the results are positive, then processor (202) will send a signal to the RF generator, transmitter, or transceiver (212) to retrieve the RF Key code from memory (410) (210), and transmit the appropriate unlocking code (412), (108). After this is done, the device will reenter the infinite loop (400), (402).

In some embodiments, the device may comprise an RF key code memory (210) and an RF generator (i.e. a transmitter or transceiver) in the form of a standard or modified RF key or key fob. Here the device may, for example, contain a cavity or other key or key fob holding device where an RF key or RF key fob (these are occasionally referred to as "smart keys") may be placed, and held in a fixed position so that a solenoid, latching solenoid, or other electromechanical mechanism (e.g. an electric motor with gears or cam) connected to the device may, upon command, press on an unlock button on the RF key or key fob. This alternative configuration allows a user to use a spare RF key or key fob to rapidly configure the device for operation.

Although different auto manufacturers produce different styles of RF keys and RF key fobs, with different shapes and with the unlock button present in different configurations, at least for the major auto manufacturers (e.g. Chrysler, Ford, GM, Honda, Hyundai Toyota and the like, typically there will be hundreds of thousands or even millions of vehicles on the road with the same type of RF key or RF key fob design. Thus the cavity or opening (502) for the RF key or RF key fob may, for example, be either customized for these various types of RF keys (504) and RF key fobs, or else may be made adjustable, for example by use of various screws or fasteners, deformable materials, or replaceable inserts, so as to be able to handle various alternative RF keys and RF key fob shapes and unlock button locations.

Although the use of electromechanical actuators, such as solenoids, to press the unlock key of an RF key or RF key fob will generally require more substantial amounts of power than is typically required to operate the device's microprocessor and other electrical components, such power needs can be accommodated, even using a relatively small battery (220), through the use of appropriate capacitors, super capacitors, and ultra capacitors (not shown), as well as through use of the optional solar cell (222). In any event, such electromechanical actuators will generally be used (and draw power) only a few times per year, and even then the use time will typically be a fraction of a second.

Figure 5:
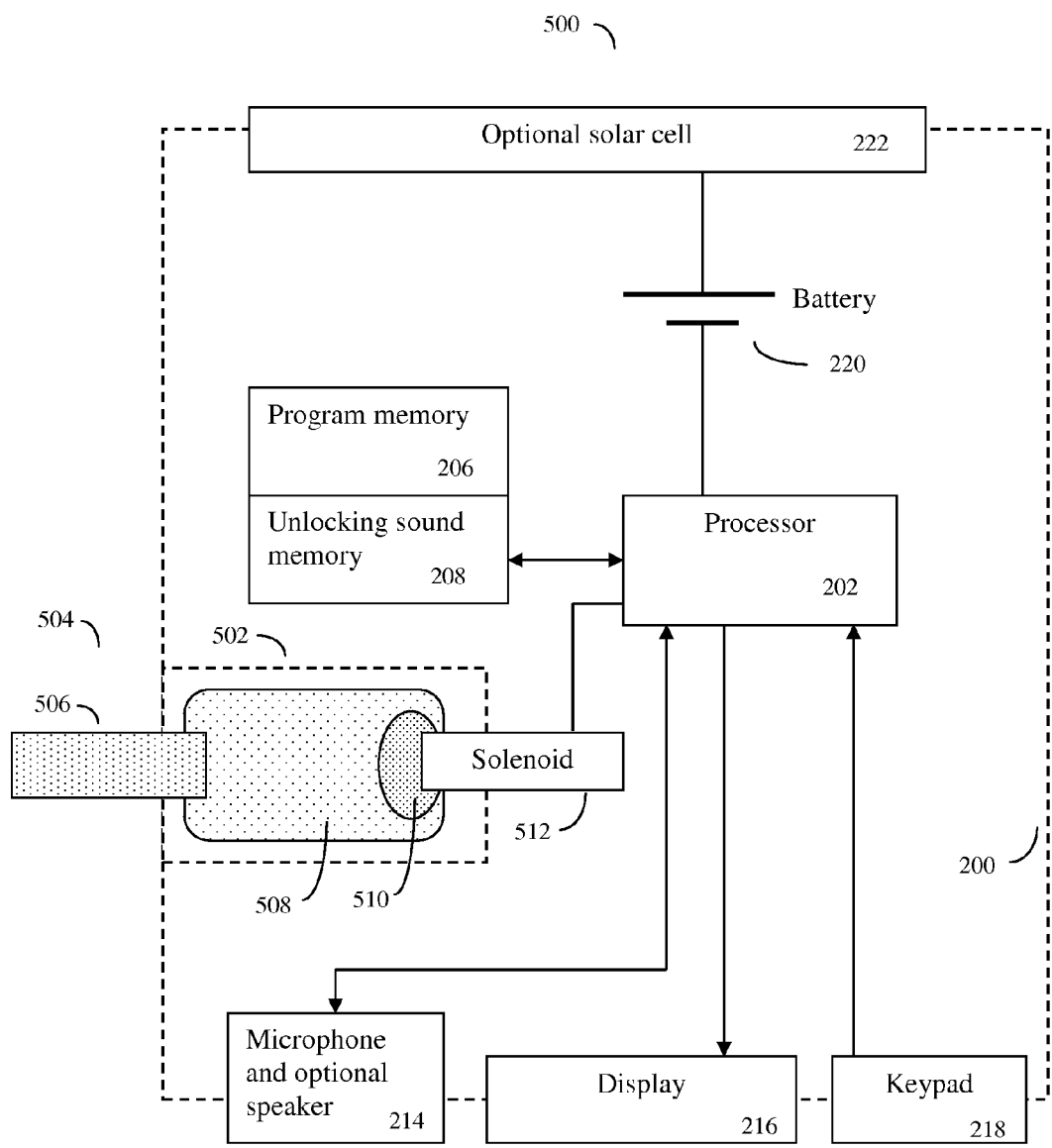
FIG. 5 shows an electrical circuit diagram for an alternative embodiment of the invention that operates using an RF key or RF key fob.

FIG. 5 shows a drawing of this alternate embodiment of the invention. In this embodiment, the device (500) has an RF key or RF key fob cavity or other type of holding fixture (502), and an RF key (504) that has a key portion (506), an RF handle (508) and an unlock button (510) is securely placed in this cavity or holding fixture (502). Here, when an unlocking sound is detected by processor (202), the processor actuates solenoid or other electromechanical actuator (512), which in turn presses unlock button (510).

Figure 6:
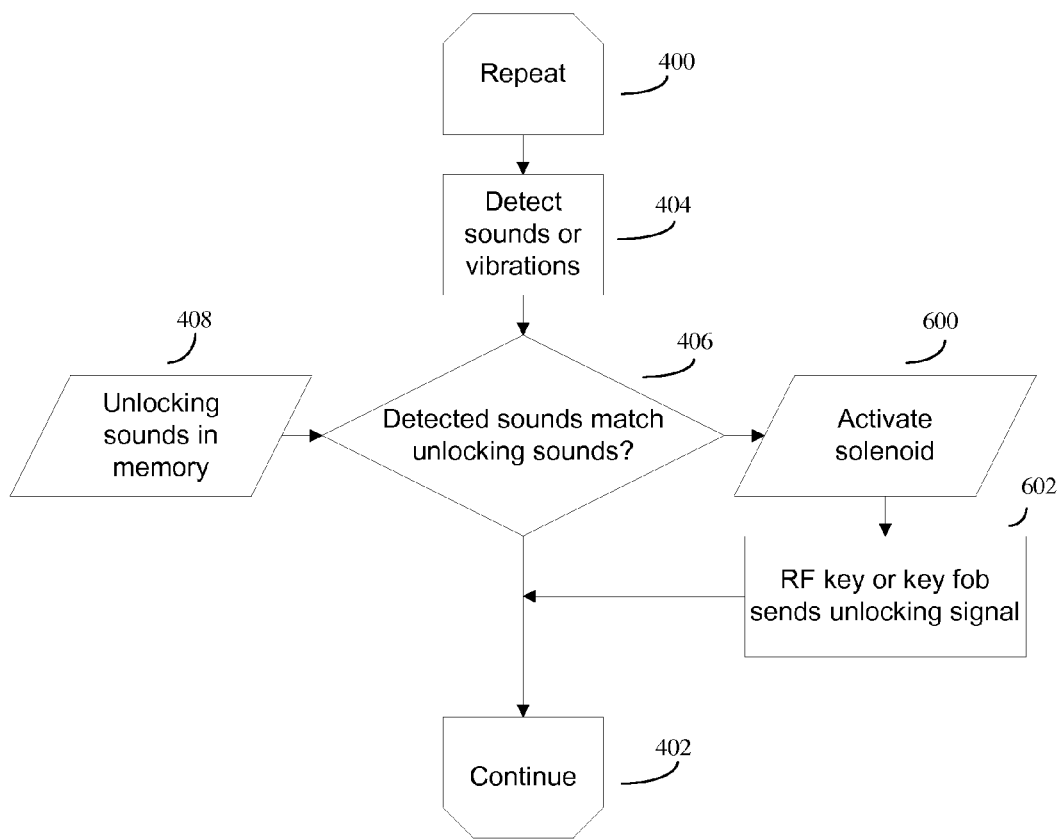
FIG. 6 shows a software flow chart for an alternative embodiment of the invention.

FIG. 6 shows an example of the operating flow chart for the alternative, embedded RF key or RF key fob, form of the device. As per FIG. 4, the device essentially spends most of its lifetime in an infinite loop (400), (402) in which it uses the sensor or transducer (214) to detect sound or vibration (404). This sound is then processed by processor (202), and compared (406) to the unlocking sounds previously stored in device memory (408), (204), (208). If the results are positive, then processor (202) will send a signal to the solenoid or other electromechanical actuator (512) (600), and this will press unlock button (510), causing the RF key or key fob (504), (508) to send the unlocking signal (602), (108). After this is done, the device will again reenter the infinite loop (400), (402).

Programming the Unlocking Sounds:

The unlocking sounds may be entered into the device by various methods. In some embodiments, the unlocking sounds may simply be pre-programmed into memory (208) by the manufacturer. Alternatively, the unlocking sounds may also be downloaded from an external website using a scheme similar to that discussed in FIG. 3.

Often, however, the user will program the device with a user selected unlocking sound. Here, user may, for example, indicate by keypad (218) that the user wishes to have the device enter into unlocking sound programming mode. This will direct the processor (202) to indicate by sound prompt (214) or display prompt (216) that the user is expected to produce an unlocking sound. The user may then produce the unlocking sound, which in principle may be any sound that the user believes will be detectable by the device (104) when the device is placed in its normal operating position, usually inside automobile (102).

The device may either give the user a predetermined time window to produce this sound, or alternatively require the user to mark the start, stop, or both times using keypad (218).

Although once the sound has been received by the device, the device may now be used, in some embodiments, it may be convenient if immediately after recording the unlocking sound, or sometime later, processor (202) retrieves this unlocking sound from memory (208) and plays this sound back using a sound transducer such as a speaker or other sound transducer (214). This will allow the user to verify that the desired unlocking sound has been recorded.

In these embodiments, then microphone or other sound transducer (214) may either be a combination microphone or speaker (214), or alternatively (214) may be considered to consist of a microphone device and a speaker device or a speaker output jack device.

Sound Comparison Algorithms:

Processor (202) and program memory (206) may use any of a variety of different sound comparison algorithms in order to determine if an input sound (106) matches the sound pattern stored in unlocking sound memory (208) sufficiently well to use this to generate an unlocking signal, while maintaining sufficient discrimination ability to avoid triggering an unlock signal due to false positive sounds.

Generally algorithms that function well in high noise environments are preferred, since users may often lock their keys into cars in noisy public parking lots. Here for example, the methods reviewed by Dufaux, "Detection and recognition of impulsive sound signals", Ph.D. thesis, Institute for Microtechnology, University of Neuchatel Switzerland, January 2001, and Dufaux et al. "AUTOMATIC SOUND DETECTION AND RECOGNITION FOR NOISY ENVIRONMENT", Proceedings of EUSIPCO 2000, European Signal Processing Conference 2000, Tampere, Fla. Sep. 5-8, 2000, or other method may be used.

The invention claimed is:

1. An aftermarket, sound activated, wireless, vehicle door unlocking device, configured to operate from inside a vehicle by a user located outside said vehicle, and configured to be aftermarket installed in said vehicle without requiring modification of said vehicle's wires or structure, comprising:
   at least one microphone
   at least one processor, at least one memory device, and software;
   an electromechanical device for pressing an unlock button of a wireless key or wireless key fob;
   a wireless key or key fob cavity configured to at least partially contain said wireless key or key fob;
   wherein said wireless key or key fob comprises an RF transmitter, transponder, or transceiver, and memory for generating an unlocking RF signal code;
   wherein said device is located inside a vehicle, and does not require that said device be physically attached to said vehicle for operation;
   wherein said device is configured to operate from inside a vehicle by a user located outside said vehicle;
   wherein an unlocking input sound sequence is stored in said at least one memory device;
   wherein said at least one processor monitors said microphone for a presence of a user created or controlled input sound sequence, and when said at least one processor detects said unlocking input sound sequence, said processor directs said electromechanical device to press said unlock button, thereby causing said device, if said wireless key or key fob is present, to emit an unlocking RF signal code capable of directing a wireless door lock of said vehicle to transition from a locked state to an unlocked state.

2. The device of claim 1, wherein said device has at least one button for manual entry of a numeric code, said numeric code further being capable of directing said device to produce said unlocking RF signal code, but wherein said device further requires sound input to direct said wireless door lock to transition from a locked state to an unlocked state.

3. The device of claim 1, wherein said device further comprises a liquid crystal display device to display information pertaining to a status of the device.

4. The device of claim 1, wherein said device further comprises a battery and/or solar cell.

5. The device of claim 1, wherein said device contains at least one inside vehicle mounting fixture selected from the group consisting of an adhesive material, a magnetic material, a suction device, a spring clamp device, or other mounting device.

6. The device of claim 1, wherein said unlocking input sound sequence comprises any of a series of telephone DTMF touch tones, voice patterns, or other speech pattern.

7. The device of claim 1, wherein said software comprises software capable of accurate sound recognition in noisy environments.

8. A method of using user created or controlled sound to enable a user located outside a vehicle to wirelessly unlock a vehicle door, said vehicle door being equipped with a wireless lock, said method comprising:
 obtaining an aftermarket, sound activated, wireless vehicle door unlocking device configured to be aftermarket installed in said vehicle without requiring modification of said vehicle's wires or structure, comprising:
 at least one microphone
 at least one processor, at least one memory device, and software;
 an electromechanical device for pressing an unlock button of a wireless key or wireless key fob;
 a wireless key or key fob cavity configured to at least partially contain said wireless key or key fob;
 wherein said wireless key or key fob comprises an RF transmitter, transponder, or transceiver, and memory for generating an unlocking RF signal code;
 wherein said device is located inside a vehicle, and does not require that said device be physically attached to said vehicle for operation;
 wherein said device is configured to operate from inside a vehicle by a user located outside said vehicle;
 wherein an unlocking input sound sequence is stored in said at least one memory device;
 wherein said at least one processor monitors said microphone for a presence of an unlocking input sound sequence, and when said at least one processor detects said unlocking input sound sequence, said processor directs said electromechanical device to press said unlock button, thereby causing, if said wireless key or key fob is present, said device to emit an unlocking RF signal code capable of directing a wireless door lock of said vehicle to transition from a locked state to an unlocked state;
 configuring said device with an unlocking input sound sequence;
 placing said wireless key or key fob in said cavity;
 mounting or placing said device in the interior of a vehicle;
 locking said vehicle doors;
 and providing a user created or controlled unlocking input sound sequence.

9. The method of claim 8, further programming said device with said unlocking input sound sequence by the steps of:
 1: indicating to said device that an unlocking input sound is about to be entered;
 2: creating an example of said unlocking input sound;
 digitizing said unlocking input sound and storing said unlocking input sound in said at least one memory device.

10. The method of claim 9, in which an unlocking input sound previously stored in said at least one memory device is verified by the steps of:
 1: indicating to said device that said unlocking input sound should be replayed;
 2: performing a digital to analog conversion of said previously stored unlocking input sound, and then recreating said unlocking input sound using said microphone,
 3: and determining if said previously stored unlocking input sound is acceptable.

11. The method of claim 8, further programming said device with said unlocking input sound by entering in a series of dual-tone multi-frequency (DTMF) sounds using a series of numbers entered onto a device keypad.

12. The method of claim 8, further programming said device with said unlocking input sound by entering in a series of numbers that can be compared to a series of dual-tone multi-frequency (DTMF) tones when a user is attempting to unlock said vehicle.

13. The device of claim 1, wherein said wireless key or key fob cavity is configured to be adjustable to conform to various alternative types of wireless key or key fobs using any of various screws or fasteners, deformable materials, or replaceable inserts.

14. The method of claim 8, further providing any of various screws, fasteners, deformable materials, or replaceable inserts for configuring said wireless key or key fob cavity to be adjustable to conform to various alternative types of wireless key or key fob.

* * * * *